United States Patent
Hatt et al.

(10) Patent No.: US 9,994,206 B2
(45) Date of Patent: Jun. 12, 2018

(54) METHOD FOR DAMPING THE TORSION OF A SCREW DRIVE FOR AN ELECTROMECHANICAL BRAKE BOOSTER, SCREW DRIVE FOR AN ELECTROMECHANICAL BRAKE BOOSTER, AND ELECTROMECHANICAL BRAKE BOOSTER

(71) Applicant: Robert Bosch GmbH, Stuttgart (DE)

(72) Inventors: Ignaz Hatt, Buchenberg (DE); Harald Guggenmos, Immenstadt/Seifen (DE); Ben Ferguson, Rettenberg (DE); Remy Garnier, Remseck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 226 days.

(21) Appl. No.: 14/843,366

(22) Filed: Sep. 2, 2015

(65) Prior Publication Data

US 2016/0068147 A1     Mar. 10, 2016

(30) Foreign Application Priority Data

Sep. 10, 2014    (DE) ........................ 10 2014 218 051

(51) Int. Cl.
| | |
|---|---|
| *F16F 15/08* | (2006.01) |
| *B60T 13/74* | (2006.01) |
| *F16H 25/20* | (2006.01) |
| *F16H 25/24* | (2006.01) |

(52) U.S. Cl.
CPC ........ *B60T 13/746* (2013.01); *F16H 25/2003* (2013.01); *F16H 25/24* (2013.01); *B60T 13/745* (2013.01); *F16F 15/08* (2013.01); *F16H 2025/2062* (2013.01); *F16H 2025/2081* (2013.01)

(58) Field of Classification Search
CPC ..... F16H 2025/2012; F16H 2025/2006; F16H 25/2021; F16H 25/2006; F16F 2025/2012
See application file for complete search history.

(56) References Cited

U.S. PATENT DOCUMENTS

| 3,323,777 A | * | 6/1967 | McMullen | ................ | B66F 3/18 |
| | | | | | 254/103 |
| 6,158,720 A | * | 12/2000 | Patrick | ..................... | B66F 3/18 |
| | | | | | 254/103 |

FOREIGN PATENT DOCUMENTS

DE           103 27 553        1/2013

\* cited by examiner

*Primary Examiner* — William Kelleher
*Assistant Examiner* — Gregory Prather
(74) *Attorney, Agent, or Firm* — Norton Rose Fulbright US LLP; Gerard Messina

(57) ABSTRACT

A screw drive for an electromechanical brake booster of a braking system of a motor vehicle includes: a threaded nut; and a threaded spindle engaged with the threaded nut. The threaded nut includes an outer section which is connectable to a drive unit for driving the threaded nut, and an inner section having a thread for accommodating the threaded spindle. The inner section and the outer section of the threaded nut are connected by a damping unit for damping the torsion of the threaded nut.

3 Claims, 3 Drawing Sheets

METHOD FOR DAMPING THE TORSION OF A SCREW DRIVE FOR AN ELECTROMECHANICAL BRAKE BOOSTER, SCREW DRIVE FOR AN ELECTROMECHANICAL BRAKE BOOSTER, AND ELECTROMECHANICAL BRAKE BOOSTER

BACKGROUND OF THE INVENTION

1. Field of the Invention

The present invention relates to a method for damping the torsion of a screw drive for an electromechanical brake booster, a screw drive for an electromechanical brake booster, and an electromechanical brake booster.

2. Description of the Related Art

Brake boosters enable the reduction of the actuating force required on the brake of a vehicle for achieving the desired braking effect. In the low-pressure brake booster predominantly installed in passenger vehicles, the actuation force is generated with the aid of a pressure difference. The pressure difference between the engine pressure and the ambient pressure is thereby used to apply a boosting force, in addition to the foot force of the driver, on the piston rod. Hydraulic or electric brake boosters are also possible.

Published German patent application document DE 103 27 553 A1 describes an electromechanical brake booster. This includes a piston rod for direct connection of a brake pedal to a piston of a main brake cylinder, an electric motor including a stator and a rotor which are situated concentrically around the piston rod, and a spindle drive including a rotatably fixedly mounted and axially moveable spindle screw, which is driven via the rotor of the motor and, during activation of the motor for brake boosting, runs up against an entrainer, and pushes this entrainer in the direction of the main brake cylinder.

BRIEF SUMMARY OF THE INVENTION

The present invention creates a screw drive for an electromechanical brake booster of a braking system of a motor vehicle including a threaded nut and a threaded spindle engaged with the threaded nut, the threaded nut having an outer section, which is connectable to drive means for driving the threaded nut, and an inner section designed with a thread for accommodating the threaded spindle, the inner section and the outer section of the threaded nut being connected by damping means which are designed for damping the torsion of the threaded nut.

The present invention further creates a method for damping the torsion of a screw drive for an electromechanical brake booster of a braking system of a motor vehicle, damping means interconnecting an inner section of a threaded nut of the screw drive, which is designed with a thread for accommodating a threaded spindle, and an outer section of the threaded nut of the screw drive, which is connectable to drive means for driving the threaded nut, and the damping means damp the torsion of the threaded nut.

Moreover, the present invention creates an electromechanical brake booster of a braking system of a motor vehicle including a screw drive according to the present invention, and drive means for driving the screw drive, the drive means having a gear wheel connected to an electric motor and which engages with an outer section of a threaded nut of the screw drive.

One concept of the present invention is to provide a screw drive for an electromechanical brake booster of a braking system of a motor vehicle, which makes it possible for a torsion load of a threaded nut of the screw drive and a load, resulting therefrom, on the drive means for driving the screw drive which are connected to the threaded nut to be compensated for by providing damping means.

According to one preferred refinement it is provided that a cavity is formed between the inner section and the outer section of the threaded nut, in which damping means are situated, the damping means being elastically deformable by a force applied by the threaded spindle on the inner section of the threaded nut. Thus, the force applied by the threaded spindle on the inner section of the threaded nut may be effectively damped by the elastic deformability of the damping means. A torsion of the inner section of the threaded nut is thus not transmitted or only partially transmitted to the outer section of the threaded nut. Thereby, a torsion of the threaded nut as well as any resulting damage to the drive means for driving the screw drive may be prevented.

According to one further preferred refinement it is provided that the damping means are formed by a plurality of meander-shaped webs, and the threaded nut is designed as a one-piece injection molded part. The meander shape of the webs in connection with the one-piece configuration of the threaded nut enables a particularly advantageous damping behavior of the damping means.

According to one further preferred refinement it is provided that the inner section of the threaded nut is rotatably mounted in the outer section of the threaded nut, the damping means being formed by a plurality of entrainer pins situated on the inner section of the threaded nut and which engage with an elastic damping mass which is connected to the outer section of the threaded nut. By providing the elastic damping mass, an effective damping of the torsion of the threaded nut may be enabled.

According to one further preferred refinement it is provided that the outer section of the threaded nut has an inner hollow cylinder and an outer hollow cylinder which are connected by a plurality of connecting elements, and the elastic damping mass includes a plurality of subsegments which are in each case situated between adjacent connecting elements. By providing the plurality of subsegments of the damping mass, which are in each case situated between adjacent connecting elements, a connection between the inner section of the threaded nut and the outer section of the threaded nut may be provided by the damping mass and by the entrainer pins, which are situated on the inner section of the threaded nut and engage in the damping mass.

According to one further preferred refinement it is provided that the inner section of the threaded nut has a cylindrical base section, in which the thread is formed for accommodating the threaded spindle, and a cylindrical head section, which is essentially disk-shaped on an end section of the base section, the plurality of entrainer pins being situated on the head section. By providing the entrainer pins on the head section and the rotatable mountability of the inner section of the threaded nut in the outer section of the threaded nut, an effective damping may be provided for the torsion load of the threaded nut.

According to one further preferred refinement it is provided that the cylindrical base section of the inner section of the threaded nut is situated in the inner hollow cylinder of the outer section of the threaded nut, and the cylindrical head section of the inner section of the threaded nut is situated in the outer hollow cylinder of the outer section of the threaded nut. The cylindrical base section and the cylindrical head section of the inner section of the threaded nut may thus both be completely countersunk in the outer section of the threaded nut. A space-saving arrangement of the screw drive is thereby possible.

According to one further preferred refinement it is provided that the cylindrical head section of the inner section of the threaded nut is situated in the outer hollow cylinder of the outer section of the threaded nut, and the cylindrical base section of the inner section of the threaded nut extends in the opposite direction from the inner hollow cylinder of the outer section of the threaded nut. The screw drive may thus be adapted to any structural requirements.

According to one further preferred refinement it is provided that the inner section of the threaded nut and the outer section of the threaded nut are in each case formed as separate injection molded parts. Due to the separation of the inner section of the threaded nut from the outer section of the threaded nut, in connection with the provision of the elastically deformable damping mass, an individual damping of the screw drive independently of the material used for the inner and outer sections of the threaded nut may thus be provided depending on the requirement.

According to one further preferred refinement it is provided that the thread of the inner section of the threaded nut is designed as a trapezoidal thread or a ball screw thread. The selection of the thread type for the threaded nut may thus be adapted to corresponding structural requirements of the screw drive.

According to one further preferred refinement it is provided that the damping means are elastically deformed by a force applied by the threaded spindle on the inner section of the threaded nut. The force applied by the threaded spindle on the inner section of the threaded nut may thus be effectively damped by the elastic deformability of the damping means. A torsion of the inner section of the threaded nut is thus not transmitted or only partially transmitted to the outer section of the threaded nut. A torsion of the threaded nut as well as any resulting damage to the drive means for driving the screw drive may thus be prevented.

According to one further preferred refinement it is provided that a force applied by the threaded spindle on the inner section of the threaded nut is damped with the aid of a plurality of meander-shaped webs. The meander shape of the webs enables a particularly advantageous damping behavior of the damping means.

According to one further preferred refinement it is provided that a force applied by the threaded spindle on the inner section of the threaded nut is damped with the aid of a plurality of entrainer pins situated on the inner section of the threaded nut, the entrainer pins engage in an elastic damping mass connected to the outer section of the threaded nut. By providing the elastic damping mass, an effective damping of the torsion load of the threaded nut may thus be enabled.

The embodiments and refinements described may be arbitrarily combined with each other.

Further possible embodiments, refinements, and implementations of the present invention also include combinations, which are not explicitly listed, of features of the present invention which were previously or are subsequently described with respect to the exemplary embodiments.

The attached drawings are to convey additional understanding of the specific embodiments of the present invention. They illustrate specific embodiments and serve in conjunction with the description to describe the principles and concepts of the present invention.

Other specific embodiments and many of the advantages listed arise with respect to the drawings. The elements represented in the drawings are not necessarily shown true to scale to each other.

DETAILED DESCRIPTION OF THE INVENTION

Figure 1:
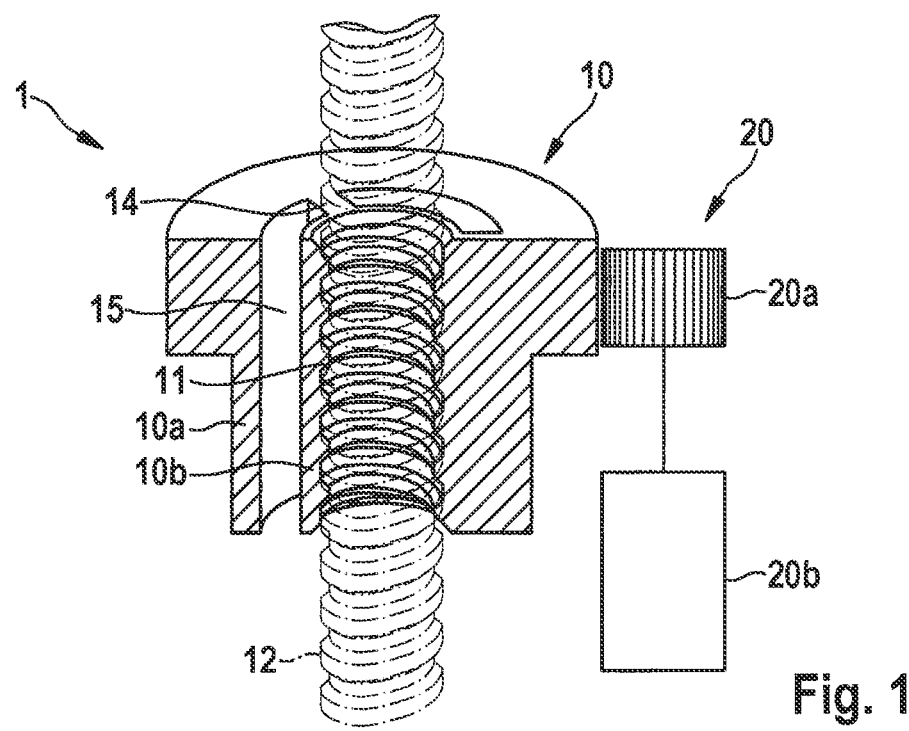
FIG. 1 shows a sectional view of a screw drive according to a first specific embodiment of the present invention.

In the figures of the drawings, the same reference numerals designate the same or functionally identical elements, parts, or components insofar as nothing to the contrary is indicated.

FIG. 1 shows a sectional view of a screw drive according to a first specific embodiment of the present invention.

FIG. 1 shows screw drive 1 and drive means 20 for driving screw drive 1. Screw drive 1 has a threaded nut 10 and a threaded spindle 12 which engages with threaded nut 10. Threaded spindle 12 is preferably made of steel. Alternatively, threaded spindle 12 may also be formed from another suitable material. Threaded nut 10 has a bearing seat or an outer section 10a and an inner section 10b. Outer section 10a is connected to drive means 20 for driving threaded nut 10. Drive means 20 have a gear wheel 20a and an electric motor 20b. Gear wheel 20a is connected to electric motor 20b via a shaft. Gear wheel 20a additionally engages with outer section 10a of threaded nut 10. Inner section 10b is designed with a thread 11 for accommodating threaded spindle 12. Thread 11 of inner section 10b of threaded nut 10 is preferably designed as a trapezoidal thread. Alternatively, thread 11 may also be designed as a ball screw thread. Inner section 10b and outer section 10a of threaded nut 10 are connected by damping means 14. Damping means 14 are situated in a cavity 15 which is formed between inner section 10b and outer section 10a of threaded nut 10. Damping means 14 are additionally designed for damping the torsion of threaded nut 10 which is effectuatable by a force applied by threaded spindle 12 on threaded nut 10.

Damping means 14 are elastically deformable by the force applied by threaded spindle 12 on inner section 10b of threaded nut 10. Damping means 14 are preferably formed by a plurality of meander-shaped webs. Alternatively, damping means 14 may also have another suitable shape. Threaded nut 10 is preferably designed as a one-piece injection molded part. Threaded nut 10 is preferably made of plastic. Alternatively, threaded nut 10 may also be formed from another suitable material. Due to the meander shape of the webs and a predetermined thickness and number, a desired damping effect of damping means 14 may thus be achieved.

Figure 2:
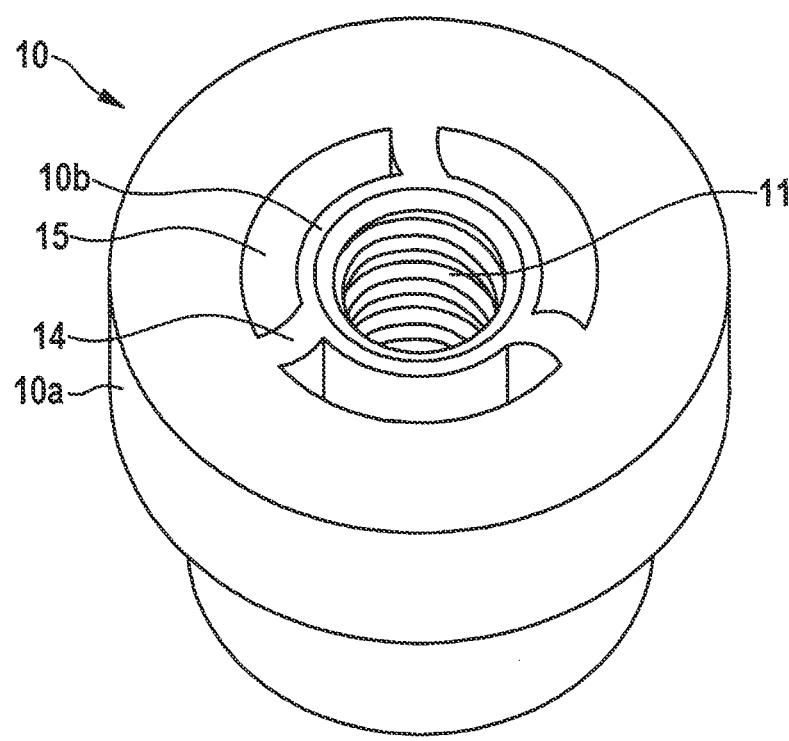
FIG. 2 shows a perspective view of the screw drive according to the first specific embodiment of the present invention.

FIG. 2 shows a perspective view of the screw drive according to the first specific embodiment of the present invention.

In the present exemplary embodiment, threaded nut 10 has three meander-shaped webs, which connect inner section 10b of threaded nut 10 to outer section 10a of threaded nut 10. The meander-shaped webs may preferably be made of a different material than inner section 10b and outer section 10a of threaded nut 10. This is possible, for example, through manufacture with the aid of a two-component injection molding method. A damping of threaded nut 10 may thus be provided which is adapted to predetermined requirements.

Figure 3:
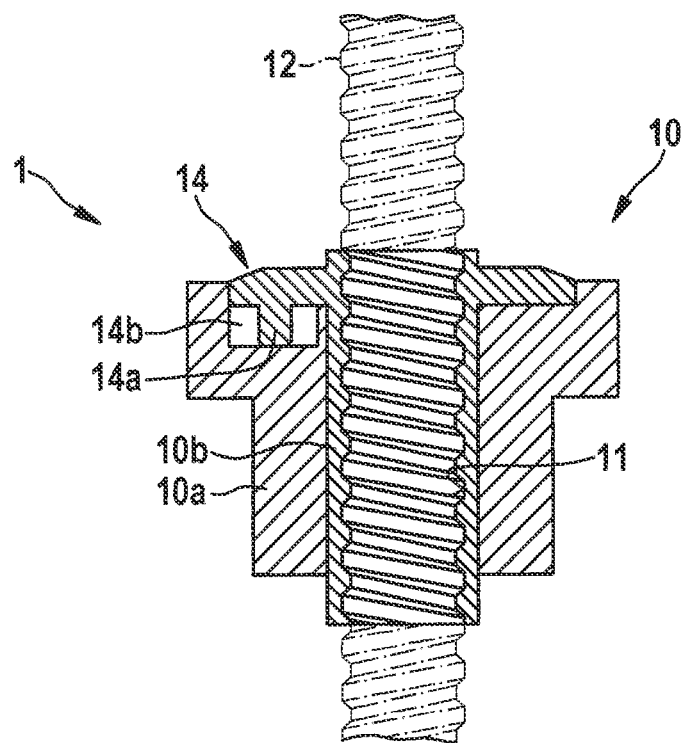
FIG. 3 shows a sectional view of a screw drive according to a second specific embodiment of the present invention.

FIG. 3 shows a sectional view of a screw drive according to a second specific embodiment of the present invention.

According to the second specific embodiment of the present invention, inner section 10b of threaded nut 10 and the bearing seat or outer section 10a of threaded nut 10 are configured separately from each other. Inner section 10b of threaded nut 10 is rotatably mounted in outer section 10a of threaded nut 10. Damping means 14 are formed by a plurality of entrainer pins 14a situated on inner section 10b of threaded nut 10 and which engage in elastic damping mass 14b, which is connected to outer section 10a of threaded nut 10. Damping mass 14b is preferably made of a rubber material. Alternatively, damping mass 14b may also be formed from another suitable material. Entrainer pins 14a are preferably connected in a form-locked manner to elastic damping means 14b.

Figure 4:
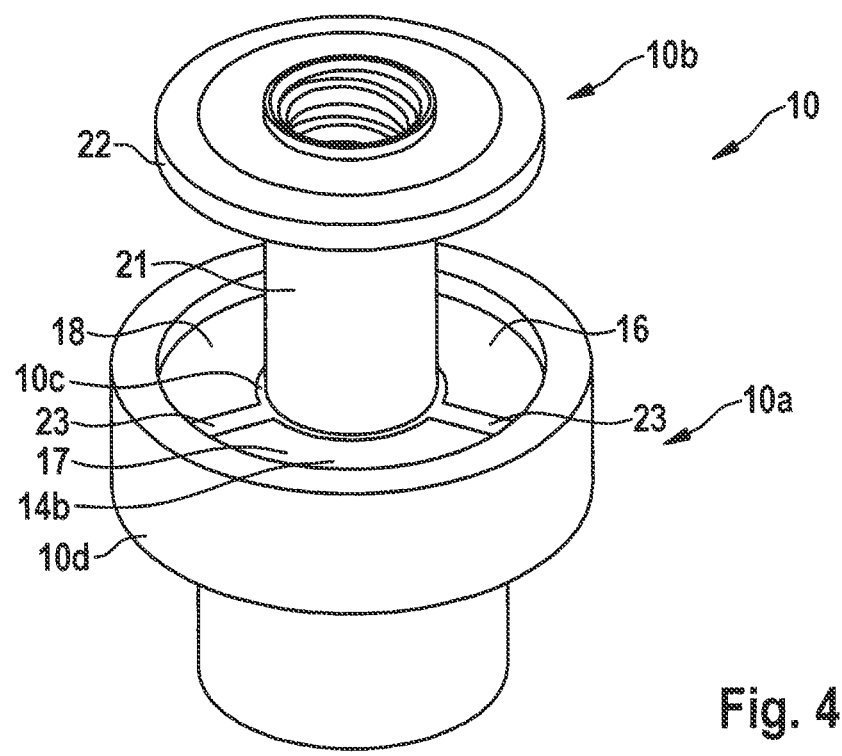
FIG. 4 shows a perspective view of the screw drive according to the second specific embodiment of the present invention.

FIG. 4 shows a perspective view of the screw drive according to the second specific embodiment of the present invention.

Outer section 10a of threaded nut 10 has an inner hollow cylinder 10c and an outer hollow cylinder 10d which are connected by a plurality of connecting elements 23. Elastic damping mass 14b has a plurality of subsegments 16, 17, 18. Subsegments 16, 17, 18 are in each case situated between adjacent connecting elements 23.

Inner section 10b of threaded nut 10 has a cylindrical base section 21 in which thread 11 is formed for accommodating threaded spindle 12. Threaded spindle 12 is preferably made of steel. Alternatively, threaded spindle 12 may also be formed from another suitable material. Inner section 10b of threaded nut 10 additionally has a cylindrical head section 22 which is essentially disk-shaped on an end section of base section 21. The plurality of entrainer pins 14a is preferably situated on head section 22.

Cylindrical base section 21 of inner section 10b of threaded nut 10 is situated in inner hollow cylinder 10c of outer section 10a of threaded nut 10. Cylindrical head section 22 of inner section 10b of threaded nut 10 is situated in outer hollow cylinder 10d of outer section 10a of threaded nut 10.

Thread 11 of inner section 10b of threaded nut 10 is preferably designed as a trapezoidal thread. Alternatively, thread 11 may also be designed as a ball screw thread.

Figure 5:
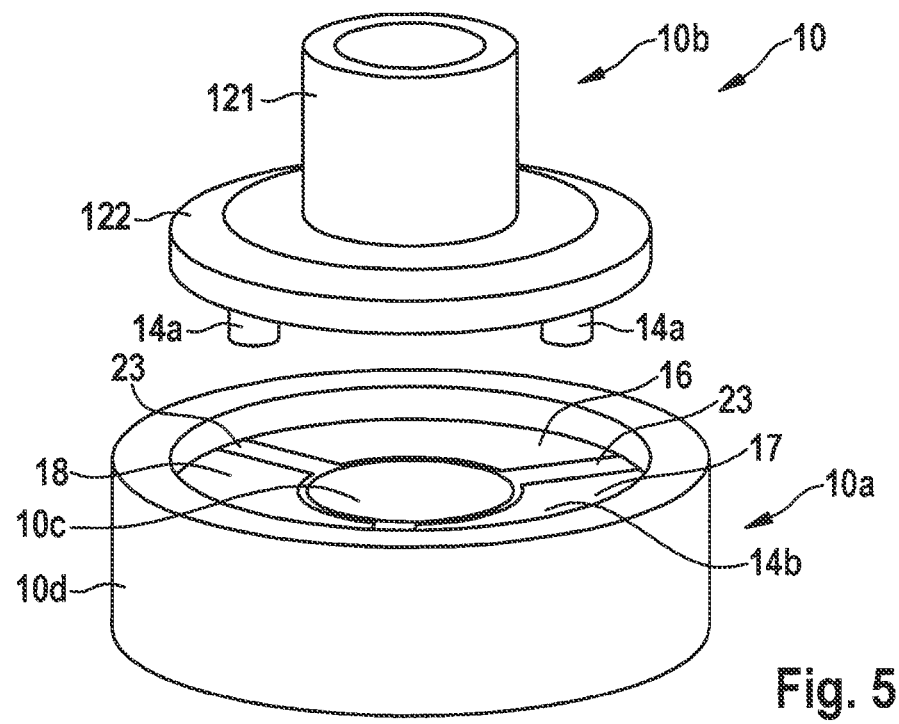
FIG. 5 shows a perspective view of the screw drive according to a third specific embodiment of the present invention.

FIG. 5 shows a perspective view of the screw drive according to a third specific embodiment of the present invention.

According to the third specific embodiment of the present invention, the bearing seat or outer section 10a of the threaded nut 10 has inner hollow cylinder 10c and outer hollow cylinder 10d, which are connected by the plurality of connecting elements 23, [and] elastic damping mass 14b has the plurality of subsegments 16, 17, 18 in each case situated between adjacent connecting elements 23. Damping mass 14b is preferably made of a rubber material. Alternatively, damping mass 14b may also be formed from another suitable material. Entrainer pins 14a are preferably connected in a form-locked manner to elastic damping means 14b.

Inner section 10b of threaded nut 10 has a cylindrical base section 121 in which thread 11 is formed for accommodating threaded spindle 12. Threaded spindle 12 is preferably made of steel. Alternatively, threaded spindle 12 may also be formed from another suitable material. Inner section 10b of threaded nut 10 moreover has a cylindrical head section 122 which is essentially disk-shaped on an end section of base section 121, whereby the plurality of entrainer pins 14a is situated on head section 122.

Cylindrical head section 122 of inner section 10b of threaded nut 10 is situated in outer hollow cylinder 10d of outer section 10a of threaded nut 10. Cylindrical base section 121 of inner section 10b of threaded nut 10 extends preferably in the opposite direction from inner hollow cylinder 10c of outer section 10a of threaded nut 10. The thread (not shown in FIG. 5) of inner section 10b of threaded nut 10 is preferably designed as a trapezoidal thread. Alternatively, the thread may also be designed as a ball screw thread.

Figure 6:
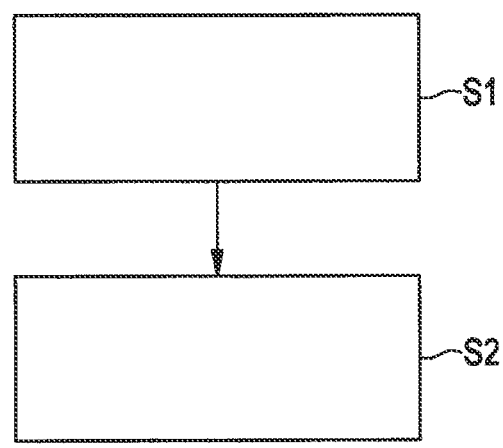
FIG. 6 shows a flow chart of a method for damping the torsion of the screw drive according to the first through third specific embodiments of the present invention.

FIG. 6 shows a flow chart of a method for damping the torsion of the screw drive according to the first through third specific embodiments of the present invention.

The method for damping the torsion of the screw drive for an electromechanical brake booster of a braking system of a motor vehicle includes that damping means 14 interconnect an inner section 10b of a threaded nut 10 of screw drive 1, which is designed with a thread 11 for receiving a threaded spindle 12, and an outer section 10a of threaded nut 10 of screw drive 1, which is connected to drive means 20 for driving threaded nut 10 and that damping means 14 damp S2 a torsion of threaded nut 10 during a force application S1 by threaded spindle 12 on threaded nut 10.

Damping means 14 are preferably elastically deformed by force application S1 by threaded spindle 12 on inner section 10b of threaded nut 10. According to the first specific embodiment of the present invention, force application S1 by threaded spindle 12 on inner section 10b of threaded nut 10 is damped with the aid of a plurality of meander-shaped webs. According to the second and third specific embodiments of the present invention it is provided that force application S1 by threaded spindle 12 on inner section 10b of threaded nut 10 is damped with the aid of a plurality of entrainer pins 14a situated on inner section 10b of threaded nut 10 and which engage in elastic damping mass 14b which is connected to the outer section of threaded nut 10.

Although the present invention has been previously described with reference to preferred exemplary embodiments, it is not limited thereto, but instead is modifiable in multiple ways. In particular, the present invention may be modified or varied in multiple ways without departing from the core of the present invention.

For example, the threaded nut may have a different shape than previously described. Alternatively, damping means 14 may also have another form or technical effect, as long as thereby a damping or decoupling of outer section 10a of the threaded nut from inner section 10b of the threaded nut is effectuatable during a force application by threaded spindle 12 on threaded nut 10. The force applied by threaded spindle 12 on threaded nut 10 may, for example, be effectuated by a hydraulic pressure pulsation in the braking pressure generator.

What is claimed is:

1. A screw drive for an electromechanical brake booster of a braking system of a motor vehicle, comprising:
   a threaded nut; and
   a threaded spindle engaged with the threaded nut, wherein the threaded nut includes (i) an outer section which is selectably connected to a drive unit for driving the threaded nut, and (ii) an inner section having a thread for accommodating the threaded spindle, and wherein the inner section and the outer section of the threaded nut are connected by a damping unit for damping a torsion of the threaded nut, the damping unit being part of the threaded nut;
   wherein a cavity is formed between the inner section and the outer section of the threaded nut, and wherein the damping unit is (i) situated in the cavity and (ii) elastically deformable by a force applied by the threaded spindle on the inner section of the threaded nut; and
   wherein the damping unit is formed by a plurality of meander-shaped webs, each of the webs connecting the inner section to the outer section, and the threaded nut including the damping unit is a one-piece injection molded part.

2. The screw drive as recited in claim 1, wherein the thread of the inner section of the threaded nut is one of a trapezoidal thread or a ball screw thread.

3. An electromechanical brake booster of a braking system of a motor vehicle, comprising:
   a screw drive including:
     a threaded nut; and
     a threaded spindle engaged with the threaded nut, wherein the threaded nut includes (i) an outer section and (ii) an inner section having a thread for accommodating the threaded spindle, and wherein the inner section and the outer section of the threaded nut are connected by a damping unit for damping a torsion of the threaded nut, the damping unit being a part of the threaded nut;
     wherein a cavity is formed between the inner section and the outer section of the threaded nut, and wherein the damping unit is (i) situated in the cavity and (ii) elastically deformable by a force applied by the threaded spindle on the inner section of the threaded nut; and
     wherein the damping unit is formed by a plurality of meander-shaped webs, each of the webs connecting the inner section to the outer section, and the threaded nut including the damping unit is a one-piece injection molded part; and
   a drive unit for driving the screw drive, wherein the drive unit includes a gear wheel connected to an electric motor which engages with the outer section of the threaded nut of the screw drive, the drive unit thereby being selectably connected to the outer section of the threaded nut for driving the threaded nut.

* * * * *